US011405933B2

(12) United States Patent
Hafeez

(10) Patent No.: US 11,405,933 B2
(45) Date of Patent: Aug. 2, 2022

(54) ALLOCATION OF WIRELESS RESOURCES IN A SHARED WIRELESS BAND

(71) Applicant: Charter Communications Operating, LLC, St. Louis, MO (US)

(72) Inventor: Abdulrauf Hafeez, Cary, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 113 days.

(21) Appl. No.: 16/818,365

(22) Filed: Mar. 13, 2020

(65) Prior Publication Data

US 2021/0289513 A1   Sep. 16, 2021

(51) Int. Cl.
| | |
|---|---|
| *H04L 12/28* | (2006.01) |
| *H04W 72/10* | (2009.01) |
| *H04W 16/14* | (2009.01) |
| *H04W 72/04* | (2009.01) |
| *H04J 1/16* | (2006.01) |

(52) U.S. Cl.
CPC ........... *H04W 72/10* (2013.01); *H04W 16/14* (2013.01); *H04W 72/0453* (2013.01)

(58) Field of Classification Search
CPC . H04W 16/14; H04W 72/0453; H04W 72/10; H04W 4/00; H04W 72/048
USPC ................................ 370/252, 329, 386, 430
See application file for complete search history.

(56) References Cited

U.S. PATENT DOCUMENTS

| | | | |
|---|---|---|---|
| 6,052,594 A | | 4/2000 | Chuang et al. |
| 8,502,733 B1 * | | 8/2013 | Negus ................. H04W 72/048 342/359 |
| 2017/0118276 A1 | | 4/2017 | Kim et al. |
| 2018/0124792 A1 * | | 5/2018 | Khoshnevisan ..... H04B 17/345 |
| 2019/0044614 A1 | | 2/2019 | Khoshnevisan et al. |
| 2019/0335337 A1 * | | 10/2019 | Damnjanovic ....... H04W 16/14 |

(Continued)

OTHER PUBLICATIONS

International Search Report, PCT/US20201/019570, dated Jun. 17, 2021, pp. 1-12.

(Continued)

*Primary Examiner* — John Pezzlo
(74) *Attorney, Agent, or Firm* — Armis IP Law, LLC

(57) ABSTRACT

A communication management resource receives channel selection information from any number of licensed entities to operate in a shared band. Assume that the communication management resource receives first channel selection information indicating channels of interest (or band partitions, bandwidth, bandwidth partitions, sub-band portions, sub-band segments, etc., of an available wireless spectrum or band) to a first entity licensed to wirelessly communicate in a wireless network. Further, the communication management resource receives second channel selection information indicating channels of interest to a second entity licensed to wirelessly communicate in the wireless network. Based on the first channel selection information and the second channel selection information, the communication management resource allocates wireless channels amongst the first entity and the second entity. Thus, the communication management resource uses the first channel selection information and the second channel selection information as guidance to assigning one or more wireless channels in the shared band to the multiple entities having licenses to use the wireless band.

38 Claims, 12 Drawing Sheets

(56) References Cited

U.S. PATENT DOCUMENTS

| | | | | |
|---|---|---|---|---|
| 2020/0344718 A1* | 10/2020 | Ozturk | ............... | H04W 68/005 |
| 2021/0022007 A1* | 1/2021 | McFadden | ............ | H04W 16/14 |
| 2021/0029562 A1* | 1/2021 | Notargiacomo | ...... | H04W 24/08 |
| 2021/0153029 A1* | 5/2021 | Mueck | ................. | H04W 16/14 |
| 2021/0234964 A1* | 7/2021 | Khawer | ............... | H04M 15/66 |
| 2021/0352488 A1* | 11/2021 | Khawer | ............... | H04W 16/14 |

OTHER PUBLICATIONS

Electronio Code of Federal Regulations e-CFR data is current as of Apr. 29, 2021, Title 47—Chapter I, Subchapter D, Part 96, Title 47: Telecommunication, pp. 1-39.

\* cited by examiner

SERVICE
PROVIDER #1
(ENTITY A)

| SUB-REGION 121-1 | SUB-REGION 121-2 | | SUB-REGION 121-1 | SUB-REGION 121-2 | |
|---|---|---|---|---|---|
| PRIORITY 1: [0000AAAA00] | [0000AAAA00] | ~221-1 | PRIORITY 32: [000AAAA000] | [0000AAAA00] | ~221-9 |
| PRIORITY 4: [00000AAAA0] | [00000AAAA0] | ~221-2 | PRIORITY 36: [0000AAAA000] | [000AAAA000] | ~221-10 |
| PRIORITY 8: [000000AAAA] | [000000AAAA] | ~221-3 | PRIORITY 40: [000000AAAA] | [0000AAAA00] | ~221-11 |
| PRIORITY 12: [000AAAA000] | [000AAAA000] | ~221-4 | PRIORITY 44: [0000AAAA00] | [000000AAAA] | ~221-12 |
| PRIORITY 16: [0000AAAA00] | [00000AAAA0] | ~221-5 | PRIORITY 48: [00000AAAA0] | [00000AAA0A] | ~221-13 |
| PRIORITY 20: [00000AAAA0] | [0000AAAA00] | ~221-6 | PRIORITY 52: [0000AAA0A0] | [00000AAA0A] | ~221-14 |
| PRIORITY 24: [000000AAAA] | [000000AAAA] | ~221-7 | | | |
| PRIORITY 28: [00000AAAA0] | [000000AAAA] | ~221-8 | | | |

SERVICE PROVIDER #4 (ENTITY D)

| | SUB-REGION 121-1 | SUB-REGION 121-2 | |
|---|---|---|---|
| PRIORITY 1: | [00000D0000] | [00000D0000] | ~ 224-1 |
| PRIORITY 2: | [000000D000] | [000000D000] | ~ 224-2 |
| PRIORITY 3: | [0000000D00] | [0000000D00] | ~ 224-3 |
| PRIORITY 4: | [00000000D0] | [00000000D0] | ~ 224-4 |
| PRIORITY 5: | [000000000D] | [000000000D] | ~ 224-5 |
| PRIORITY 6: | [0000D00000] | [0000D00000] | ~ 224-6 |
| PRIORITY 7: | [000D000000] | [000D000000] | ~ 224-7 |
| PRIORITY 8: | [00D0000000] | [00D0000000] | ~ 224-8 |
| PRIORITY 9: | [0D00000000] | [0D00000000] | ~ 224-9 |

SUMMATION OF PRIORITIES FOR ENTITIES A, B, C, D

PA + PB + PC + PD = PRIORITY VALUE

WHERE PA = PRIORITY ASSOCIATED WITH ENTITY A

WHERE PB = PRIORITY ASSOCIATED WITH ENTITY B

WHERE PC = PRIORITY ASSOCIATED WITH ENTITY C

WHERE PD = PRIORITY ASSOCIATED WITH ENTITY D

PV(1) = 1 + 5 + 5 + 7 = 18

PV(2) = 4 + 6 + 6 + 5 = 21

PV(3) = 8 + 1 + 1 + 7 = 17

PV(4) = 8 + 6 + 6 + 1 = 21

PV(5) = 12 + 4 + 4 + 5 = 25

· · ·

ALLOCATION OF WIRELESS RESOURCES IN A SHARED WIRELESS BAND

BACKGROUND

Conventional wireless networks typically include one or more wireless base stations to provide mobile communication devices access to a remote network such as the Internet. One type of wireless base station is a so-called CBSD (Citizen Broadband Radio Service Device). Such a device uses a wireless channel allocated from a CBRS (Citizens Band Radio Service) band to support communications with one or more mobile communication devices.

Typically, a so-called SAS (Spectrum Access Service) in a CBRS network allocates one or more wireless channels to a CBSD (such as a wireless base station) to support communications with respective user equipment such as one or more mobile communication devices. Each base station can be configured to communicate with the SAS to receive notification of the one or more wireless channels allocated for its use. Controlled allocation of wireless channels by the spectrum access system helps to prevent interference and increase spectrum use.

There are multiple different types of wireless channels in a conventional CBRS band. For example, portions of CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use of one or more allocated wireless channels from the CBRS band. For example, when no incumbent user (e.g., Government authority) requires use of the channels, the licensed entities are able to freely use the PAL wireless channels in respective one or more predetermined geographical regions without interference by other users (such as lower priority GAA users). General authorized access (GAA) users are able to use the band without a license where available.

Subsequent to allocation, the wireless base station then uses the allocated channels to provide one or more communication devices access to a remote network such as the Internet.

A portion of spectrum comprising 10 MHz channels are available in areas (such as counties) in the 3550-3650 MHz frequency range in the CBRS band. Up to 7 licenses will be awarded in each county. Each entity can buy rights for up to 4 licenses. The exact frequency range associated with a respective license is not guaranteed because it can change due to incumbent activity. In certain instances, a spectrum access system (SAS) will determine a primary and a secondary channel allocation for so-called PAL users.

It may be further noted that there are certain rules (such as § 96.25) that an SAS must follow in order to allocate channels to corresponding PAL users. For example, Part 96 Rules: (b)(1)(*i*). Contiguous geographic areas: An SAS must assign geographically contiguous PALs held by the same Priority Access Licensee to the same channels in each geographic area, to the extent feasible. The SAS may temporarily reassign individual PALs held by the same Priority Access Licensee to different channels, so that geographical contiguity is temporarily not maintained, to the extent necessary to protect Incumbent Users or if necessary to perform its required functions under subpart F of this part, (b)(2)(*i*). Contiguous channels: An SAS must assign multiple channels held by the same Priority Access Licensee to contiguous channels in the same License Area, to the extent feasible.

In certain instances, the SAS may temporarily reassign individual PALs to non-contiguous channels to the extent necessary to protect Incumbent users or, if necessary, to perform its required functions under subpart F.

All PAL channels are not necessarily created equal. For example, some PAL channels may be subject to incumbent protection (e.g., co-channel FSS in 3625-3650 MHz). Band edge channels in the CBRS spectrum may require reduced UE transmission power to meet Federal Communication Commission (FCC) Out of Band Emission (DOBE) requirements.

BRIEF DESCRIPTION OF EMBODIMENTS

There are deficiencies associated with conventional techniques of allocating use of wireless channels in a network environment. For example, conventional techniques do not provide an appropriate way to ensure fairness of channel allocation amongst different licensees. More specifically, conventional channel assignment methods associated with allocation of wireless channels thus far suffer from one or more of the following issues: i) they do not consider geographical channel contiguity, ii) they do not attempt fairness for each license area, iii) the typically give an unfair advantage to the largest licensee in each license area, iv) they use fixed priorities for channel allocation fairness, v) they do not allow licensees to collaborate for a better solution, and so on.

As further discussed herein, embodiments herein propose methods for channel assignment that address one or more of the above issues. For example, embodiments herein are applicable to any shared wireless band in which N channels are to be shared among M licensees.

Each licensee may have different priorities with respect to geographical or physical channel contiguity and channel quality. For example, operators planning to use CBRS for mobility, traffic offload, and backhaul use cases may have different priorities (channels of interest). Further, an operator's priorities may also be different in different licensed areas (such as counties or other sized geographical regions). It can be difficult to pick a channel assignment that satisfies all PAL users.

Embodiments herein provide novel ways of providing improved allocation and use of wireless channels amongst different entities sharing use of band in a wireless network environment.

More specifically, according to one example embodiment, a communication management resource receives channel selection information from any number of entities. Note that, as described herein, channel refers to any portion of a respective wireless spectrum, bandwidth, etc., available for allocation or use by one or more entities. Assume in this example embodiment that the communication management resource receives first channel selection information indicating one or more channels of interest (such as band partitions) to a first entity licensed to wirelessly communicate in a wireless network. Further, the communication management resource also receives second channel selection information indicating one or more channels of interest to a second entity licensed to wirelessly communicate in the wireless network. Based on the first channel selection information and the second channel selection information, the communication management resource allocates one or more wireless channels (such as portions, bandwidth, segments, etc., of an available wireless spectrum or band) amongst the first entity and the second entity. In other words, the communication management resource uses the first channel selection information and the second channel selection information as guidance to assigning one or more wireless channels in the available band to the multiple entities having licenses to use the wireless band.

In accordance with further example embodiments, the first channel selection information indicates a priority (selection) ranking of first wireless channels of interest (in the available band) to the first entity; the second channel selection information indicates a priority (selection) ranking of second wireless channels of interest (in the available band) to the second entity. In certain instances, the first entity and second entity select different channels, making the allocation decision simple.

As further discussed herein, the channel selection information can take any suitable form and be provided by respective licensees that have paid for use of the wireless spectrum being divvied up and assigned to different users.

Note that the first channel selection information and second channel selection information indicate the same or different rankings of desirable wireless channels. For example, in one embodiment, the priority ranking of the first wireless channels of interest indicates a first wireless channel as being of greater interest than a second wireless channel to the first entity; the priority ranking of the second wireless channel of interest indicates the second wireless channels as being of greater interest than the first wireless channel to the second entity.

Still further embodiments herein include allocating different wireless channels in the wireless band based on the first channel selection information and the second channel selection information. For example, in one embodiment, in accordance with the first channel selection information and the second channel selection information, the communication management resource: i) assigns a first wireless channel for use by the first entity, and ii) assigns a second wireless channel for use by the second entity. In yet further example embodiments, the wireless network includes multiple sub-regions in which the wireless band is allocated to the first entity and the second entity in the multiple sub-regions (such as town, county, etc.). The first entity is licensed to operate in one or more of the multiple sub-regions; the second entity is also licensed to operate in one or more of the multiple sub-regions.

In accordance with further example embodiments, the available wireless band allocated amongst the first entity and the second entity includes a set of multiple contiguous wireless channels. In such an instance, allocation of the communication management resource includes allocation of a first group of contiguous wireless channels from the set in accordance with the first channel selection information, as well as allocation of a second group of contiguous wireless channels from the set in accordance with the second channel selection information.

The channel selection information as described herein includes any suitable information indicating channels of interest. For example, in one embodiment, the first channel selection information indicates priority rankings of first sets of wireless channels of interest to the first entity for each of multiple different regions in which the wireless band is allocated; the second channel selection information indicates priority rankings of second sets of wireless channels of interest to the second entity for each of the multiple different regions in which the wireless band is allocated.

The communication management resource can be configured to apply first weight factors to the priority rankings of the first channels of interest associated with the first entity depending on a number of channels licensed by the first entity. In a similar manner, the communication management resource can be configured to apply second weight factors to the priority rankings of the second channels of interest to the second entity depending on a number of channels licensed by the second entity.

Note that further embodiments herein include producing multiple ranking metrics including a respective ranking metric for each of multiple different possible permutations of allocating channels in the wireless band amongst the first entity and the second entity. In such an instance, the communication management resource allocates the wireless band (such as one or more wireless channels) based on a comparison of the ranking metrics. More specifically, in one embodiment, allocation of portions of the wireless band based on the comparison of the ranking metrics includes selecting an allocation of wireless channels in the wireless band that best accommodates (such as satisfying highest priority) requested channels as indicated by the first channel selection information and the second channel selection information. In this manner, each of the first entity and the second entity are more likely to be assigned channels of interest.

In yet further example embodiments, each of the first channel selection information and the second channel selection information indicates a priority ranking of one or more attributes of wireless channels of interest. The attributes can vary depending on the implementation. In one embodiment, the one or more attributes of desired wireless channels are selected from a group of attributes comprising: i) a first attribute requesting allocation of contiguous wireless channels in the wireless band, ii) a second attribute requesting allocation of wireless channels nearer in a middle of the wireless band, and iii) a third attribute requesting allocation of a same frequency of wireless channels in the wireless band for use in multiple different sub-regions of the wireless network, etc.

Accordingly, each license entity can rank the different attributes to indicate what types of respective channels are most important to them. For example, the first entity may desire channels that are next to each other in the available wireless band and not care about whether the channels are in the middle of available band; the second entity may desire channels that in the middle of the available band and not care about whether the channels are contiguous. In such an instance, on order to accommodate both entities, the communication management resource allocates the mid-band channels to the second entity and the contiguous channels away from the mid-band to the first entity.

These and further embodiment are discussed below in more detail.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: receive first channel selection information indicating one or more channels of interest to a first entity licensed to wirelessly communicate in a wireless network; receive second channel selection information indicating one or more channels of interest to a second entity licensed to wirelessly communicate in the wireless network; and allocate wireless band amongst the first entity and the second entity based on the first channel selection information and the second channel selection information.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of allocating portions of an available wireless spectrum in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 4 is an example diagram illustrating channel selection information and corresponding priority of sets of channels of interest to a first licensed entity according to embodiments herein.

FIG. 6 is an example diagram illustrating channel selection information and corresponding priority of sets of channels of interest to a fourth licensed entity according to embodiments herein.

Figure 1:
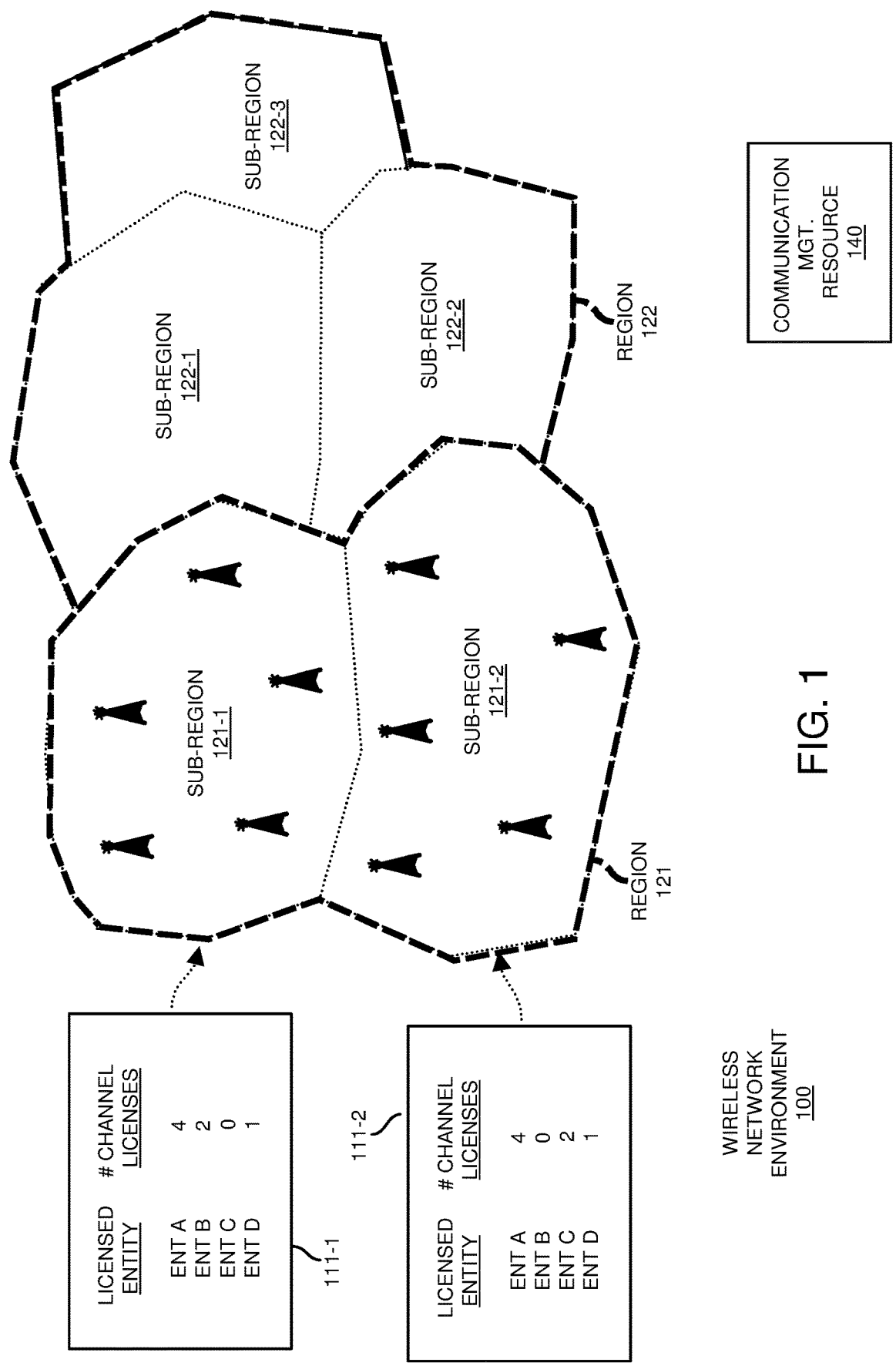
FIG. 1 is an example diagram illustrating multiple licensed entities to communicate in a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a communication management resource. The communication management resource receives channel selection information from any number of licensed entities. As an illustrative example, assume that the communication management resource receives first channel selection information indicating channels of interest (such as bandwidth, band partitions, sub-band portions, sub-band segments, etc., of an available wireless spectrum or band) to a first entity licensed to wirelessly communicate in a wireless network. Further, assume that the communication management resource also receives second channel selection information indicating channels of interest (such as bandwidth, bandwidth partitions, sub-band portions, sub-band segments, etc., of an available wireless spectrum or band) to a second entity licensed to wirelessly communicate in the wireless network. Based on the first channel selection information and the second channel selection information, the communication management resource allocates wireless band resources amongst the first entity and the second entity. In one embodiment, the communication management resource uses the first channel selection information and the second channel selection information as guidance to assigning one or more wireless channels (such as bandwidth, bandwidth portions, bandwidth partitions, sub-band portions, sub-band segments, etc.) in the available bandwidth to the multiple entities having licenses to use the wireless band.

Now, more specifically, FIG. 1 is an example diagram illustrating allocation of wireless band portions to each of multiple licensed entities according to embodiments herein.

As shown in this example embodiment, network environment 100 includes a geographical region divided into region 121, region 122, etc. Note that the network environment 100 can be broken down into any number of regions.

Further in this example embodiment, each of the regions 121, 122, etc., includes multiple sub-regions (such as counties, towns, or other suitable sized area). More specifically, region 121 (such as a so-called allocation group) in this example embodiment includes sub-region 121-1 and sub-region 121-2; region 122 includes sub-region 122-1, sub-region 122-2, and sub-region 122-3.

One embodiment herein includes grouping the sub-regions based on nearness to each other. For example, each of the one or more regions 121, 122, etc., can be configured to include multiple contiguous sub-regions.

In accordance with further example embodiments, the communication management resource 140 is configured to limit the number of sub-regions (such as counties) per region (allocation group) to fewer than 6 to reduce the complexity of the corresponding channel allocation algorithm (such as implemented by the communication management resource 140) as described herein. Thus, the number of sub-regions in a respective region can vary between 1-6, or be any other suitable value greater than 6.

If desired, the communication management resource 140 (or other suitable entity) groups counties (or regions) that are naturally isolated from each other (e.g. by bodies of water) via assigning them to separate regions.

As further shown in this example embodiment, assume that the multiple entities such as entity A, entity B, entity C, and entity D bid and acquire respective licenses to operate in respective sub-regions 121-1 and 121-2 associated with the region 121.

More specifically, as shown via license information 111-1 associated with the sub-region 121-1, entity A obtains licenses to use 4 wireless channels in the sub-region 121-1 associated with region 121; entity B obtains licenses to use 2 wireless channels in the sub-region 121-1 associated with region 121; entity D obtains a license to use 1 wireless channel in the sub-region 121-1 associated with region 121.

Additionally, license information 111-2 associated with the sub-region 121-2 indicates that entity A obtains licenses to use 4 wireless channels in the sub-region 121-2 associated with region 121; entity C obtains licenses to use 2 wireless channels in the sub-region 121-2 associated with region 121; entity D obtains a license to use 1 wireless channel in the sub-region 121-2 associated with region 121.

Figure 3:
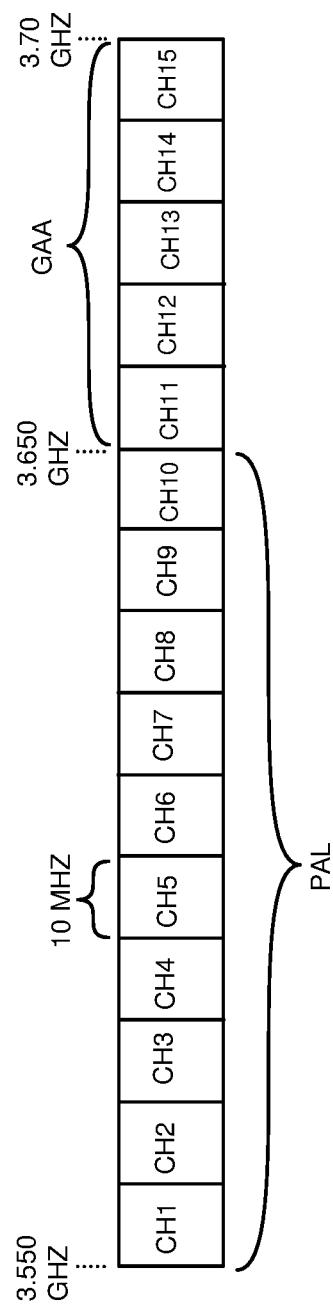
FIG. 3 is an example diagram illustrating multiple channels in a (wireless) band according to embodiments herein.

In one embodiment, the wireless network environment 100 supports wireless communications over CBRS (Citizens Band Radio System) channels. As shown in FIG. 3, a portion of 10 MHz channels in the CBRS band (such as labeled channels 1-10 or, more specifically, CH1, CH2, CH3, CH4, CH5, CH6, CH7, CH8, CH9, and CH10) are available for use in each region (such as county, or other sized area) in the frequency range 3550-3650 MHz (3.550-3.6550 GHz). Up to 7 channel licenses will be awarded to respective bidding entities in each sub-region (such as county or other sized region). Each entity (such as wireless service provider) can buy rights for up to 4 licenses, although this number may vary depending on the embodiment.

In one embodiment, the exact frequency range associated with a respective entity license is not guaranteed because it can change due to incumbent activity. For example, as previously discussed, an incumbent user such as the government has highest priority rights in the available band and may terminate use of one or more wireless channels by other users.

In certain instances, a respective spectrum access system (SAS) controlling use of the different available wireless channels will determine a primary and a secondary channel allocation for so-called PAL users (such as entity A, entity B, entity C, and entity D) and implement same depending on current operating conditions.

In accordance with further example embodiments, each of the entities in the wireless network environment 100 operates one or more wireless base station (such as CBSDs) to communicate with one or more respective mobile communication devices or stationary communication devices. The communication management resource 140 pre-assigns the different entities one or more licensed wireless channels for use in the wireless network environment 100.

This disclosure includes the observation that each licensee (such as entity A, entity B, entity C, and entity D) may have different priorities and interest with respect to geographical or physical channel contiguity and channel quality.

For example, operators planning to use CBRS for mobility, traffic offload, and backhaul use cases may have different priorities (channels of interest). Further, an operator's priorities may also be different in different licensed areas (such as counties or other sized geographical region). It can be difficult to pick a channel assignment that satisfies all PAL users.

Embodiments herein provide novel ways of providing improved allocation and use of wireless channels amongst different entities sharing use of bandwidth in a wireless network environment.

Figure 2:
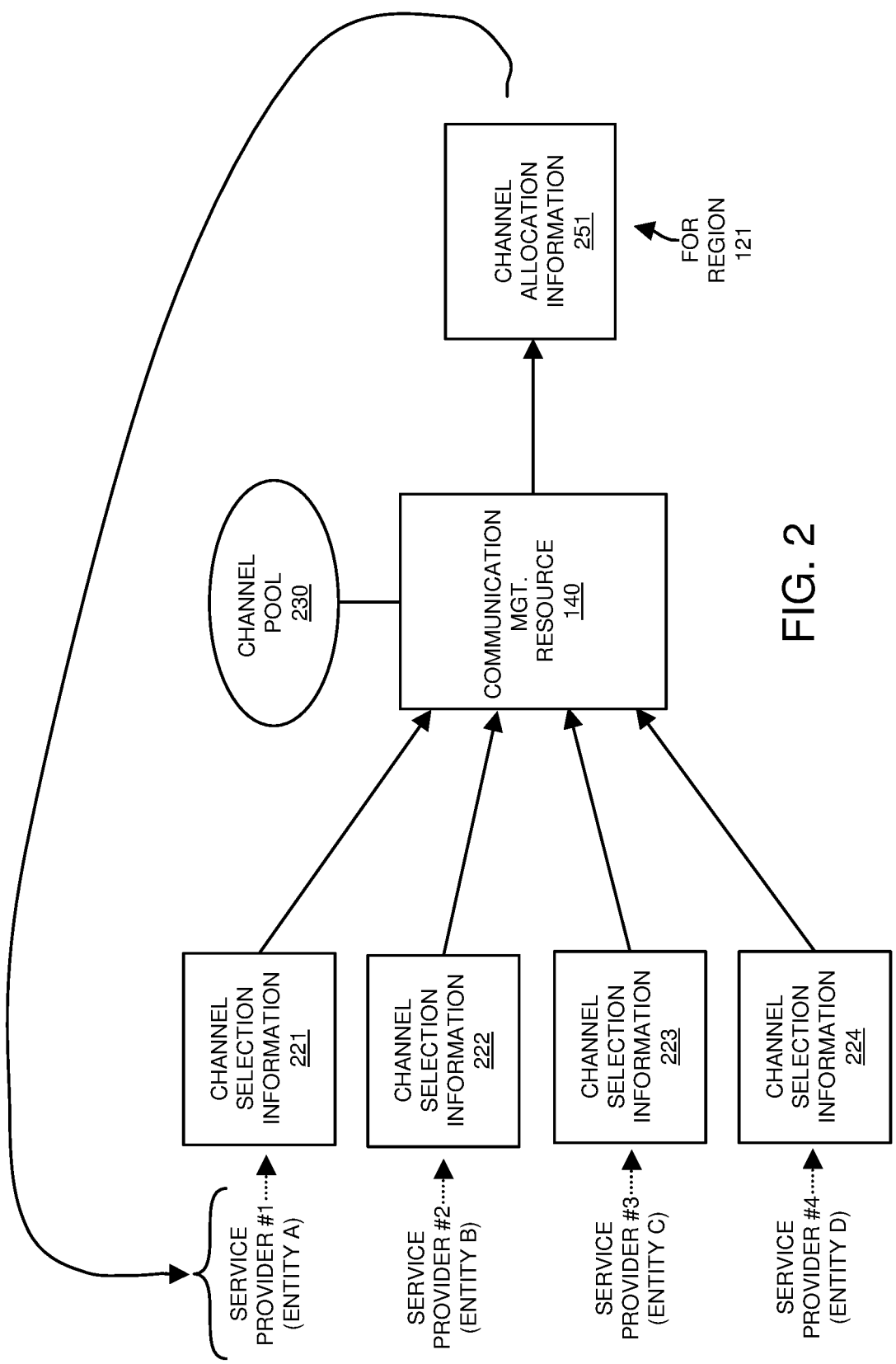
FIG. 2 is an example diagram illustrating generation of channel allocation information via channel selection information from multiple licensed entities according to embodiments herein.

FIG. 2 is an example diagram illustrating generation of channel allocation information via channel selection information from multiple licensed entities according to embodiments herein.

According to one example embodiment, in furtherance of implementing fair allocation of wireless channels (or any wireless band) to the multiple entities, the communication management resource 140 receives channel selection information from any number of entities.

In this example embodiment, the communication management resource 140 receives first channel selection information 221 specifying channels of interest (such as channels or other bandwidth partitions) requested by a first entity A licensed to wirelessly communicate in the region 121; the communication management resource 140 receives second channel selection information 222 specifying channels of interest (such as bandwidth partitions, sub-band portions, sub-band segments, etc.) requested by a second entity B licensed to wirelessly communicate in the wireless network; the communication management resource 140 receives third channel selection information 223 specifying channels of interest (such as bandwidth partitions, sub-band portions, sub-band segments, etc.) requested by a second entity C licensed to wirelessly communicate in the wireless network; and the communication management resource 140 receives fourth channel selection information 224 specifying channels of interest requested by a second entity D licensed to wirelessly communicate in the wireless network environment 100.

Based on a combination of the channel selection information 221, channel selection information 222, channel selection information 223, and channel selection information 224, the communication management resource 140 allocates wireless band (such as one or more wireless PAL channels) amongst the different licensed entities A, B, C, and D. In other words, the communication management resource 140 uses the channel selection information provided by each of the different licensed entities as guidance to assigning one or more wireless channels in the available bandwidth (such as wireless channels CH1, CH2, CH3, . . . ) to the multiple entities having licenses to use the wireless band.

In this example embodiment, the communication management resource 140 chooses channels (such as bandwidth partitions, sub-band portions, sub-band segments, etc.) from channel pool 230 (such as including wireless channels CH1, CH2, CH3, . . . associated with a CBRS band in FIG. 3 or other suitable band) to produce channel allocation information 251 indicating the different wireless channels assigned to the respective entities (such as different wireless service providers) for use in region 121.

FIG. 4 is an example diagram illustrating channel selection information and corresponding priority of channels of interest to a first licensed entity according to embodiments herein.

As previously discussed, the channel selection information as described herein includes any suitable information indicating channels of interest.

More specifically, in one embodiment, the channel selection information 221 indicates priority rankings of first sets of wireless channels of interest (in FIG. 4) to the entity A for each of multiple different regions in which the wireless band is allocated; the channel selection information 222 indicates priority rankings of second sets of wireless channels of interest (in FIG. 5) to the entity B for the region in which the wireless band is allocated; the third channel selection information 223 indicates priority rankings of third sets of wireless channels of interest (in FIG. 5) to the entity C for the region in which the wireless band is allocated; the fourth channel selection information 224 indicates priority rankings of fourth sets of wireless channels of interest (in FIG. 6) to the entity D for each of the multiple different regions in which the wireless band is allocated.

Referring again to FIG. 4, in this example embodiment, the respective entity A specifically identifies the channels of interest via respective channel selection information 221-1, channel selection information 221-2, channel selection information 221-3, etc. As previously discussed, there are 10 available wireless channels. In one embodiment, each entry of the channel selection information is formatted to indicate the different channels. For example, each slot or symbol position in the bracketed data indicates selection of a different wireless channel as follows:

[CH1, CH2, CH3, CH4, CH5, CH6, CH7, CH8, CH9, CH10].

Thus, channel selection information 221-1 (namely, [0000AAAA00] indicates selection of wireless channels 5, 6, 7, and 8 for use in both sub-region 121-1 and sub-region 121-2. The communication management resource 140 assigns the channel selection information 221-1 a priority value of 1 (highest priority selection of wireless channels by entity A).

Channel selection information 221-2 (namely, [00000AAAA0] indicates selection of wireless channels 6, 7, 8, and 9 for use in both sub-region 121-1 and sub-region 121-2. The communication management resource 140 assigns the channel selection information 221-2 a priority value of 4 (second highest priority selection of wireless channels by entity A).

Channel selection information 221-3 (namely, [000000AAAA] indicates selection of wireless channels 7, 8, 9, and 10 for use in both sub-region 121-1 and sub-region 121-2. The communication management resource 140 assigns the channel selection information 221-3 a priority value of 8 (third highest priority selection of wireless channels by entity C).

Channel selection information 221-4 (namely, [000AAAA000] indicates selection of wireless channels 4, 5, 6, and 7 for use in both sub-region 121-1 and sub-region 121-2. The communication management resource 140 assigns the channel selection information 221-4 a priority value of 12 (fourth highest priority selection of wireless channels by entity D).

Channel selection information 221-5 (namely, [0000AAAA00] indicates selection of wireless channels 5, 6, 7, and 8 for use in sub-region 121-1; channel selection information 221-5 (namely, [00000AAAA0] indicates selection of wireless channels 6, 7, 8, and 9 for use in both sub-region 121-2. The communication management resource 140 assigns the channel selection information 221-5 a priority value of 16 (fifth highest priority selection of wireless channels by entity A).

Channel selection information 221-6 (namely, [00000AAAA0] indicates selection of wireless channels 6, 7, 8, and 9 for use in sub-region 121-1; channel selection information 221-6 (namely, [0000AAAA00] indicates selection of wireless channels 5, 6, 7, and 8 for use in sub-region 121-2. The communication management resource 140 assigns the channel selection information 221-6 a priority value of 20 (sixth highest priority selection of wireless channels by entity A).

Ranking of the sets of bracketed data indicates which wireless channels and corresponding permutations are of greatest interest to the entity A.

As shown, the communication management resource 140 can be configured to apply weight factors to the priority rankings of the first channels of interest associated with the first entity A depending on a number of channels licensed by the first entity.

For example, the entity A is assigned 4 wireless channels. In such an instance, the first channel selection information 221-1 is assigned a weight factor such that the highest priority channel selection information 221-1 is assigned a priority value of 1; the second channel selection information 221-2 is assigned a weight factor such that the second highest priority channel selection information 221-2 is assigned a priority value of 4; the third channel selection information 221-3 is assigned a weight factor such that the third highest priority channel selection information 221-3 is assigned a priority value of 8; and so on. Use of the ranking weights is further discussed below.

Figure 5:
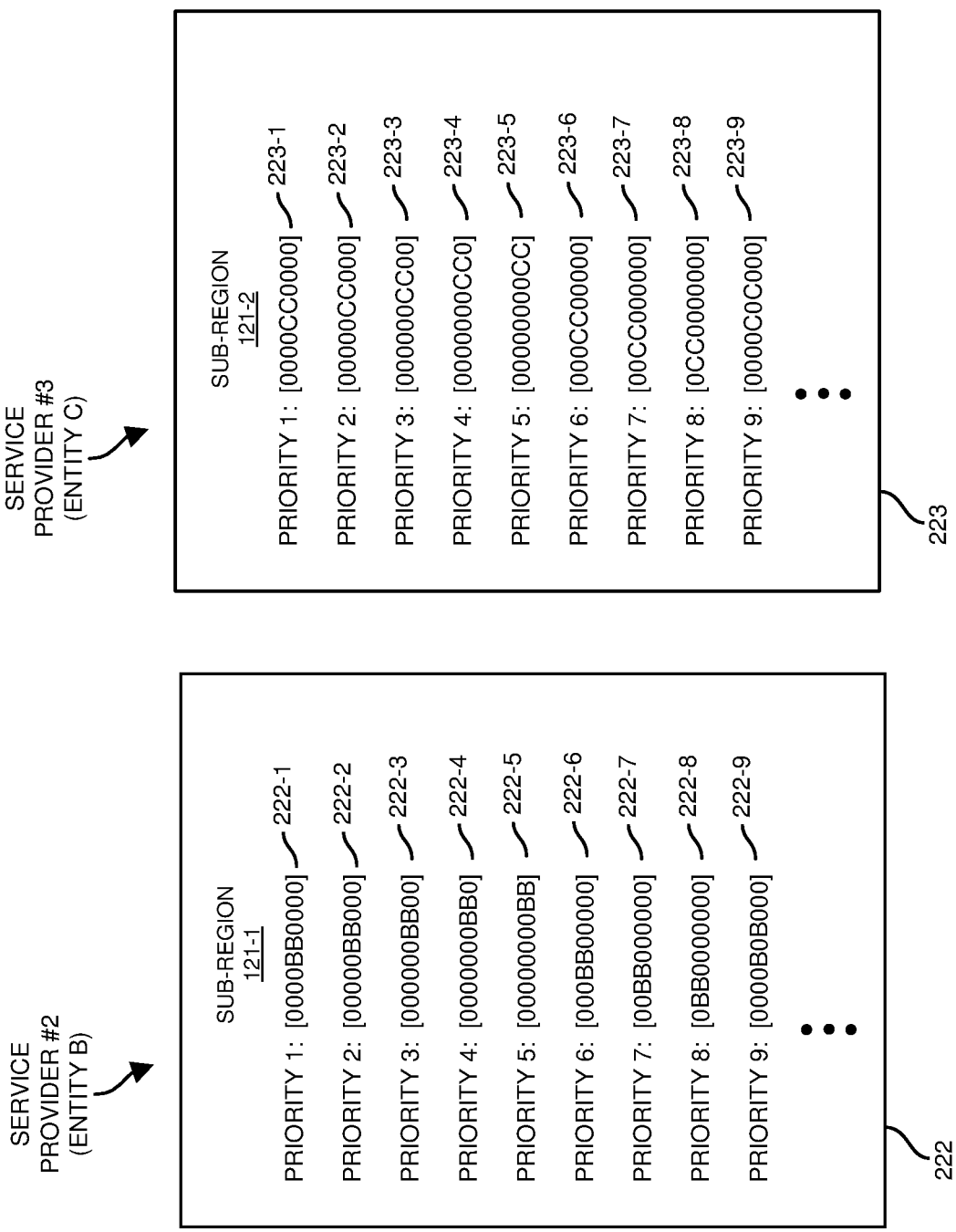
FIG. 5 is an example diagram illustrating channel selection information and corresponding priority of sets of channels of interest associated with second licensed and third licensed entity according to embodiments herein.

FIG. 5 is an example diagram illustrating channel selection information and corresponding priority of channels of interest associated with second licensed and third licensed entity according to embodiments herein.

As previously discussed, there are 10 available wireless channels. The channel selection information is formatted to indicate the different channels. For example, each slot or symbol position in the bracketed data indicates selection of a different wireless channel as follows:

[CH1, CH2, CH3, CH4, CH5, CH6, CH7, CH8, CH9, CH10].

Thus, channel selection information 222-1 (namely, [0000BB0000] indicates selection of wireless channels 5 and 6 for use in sub-region 121-1. In such an instance, the communication management resource 140 assigns the channel selection information 222-1 a priority value of 1 (highest priority selection of wireless channels by entity B).

Channel selection information 222-2 (namely, [00000BB000] indicates selection of wireless channels 6 and 7 for use in sub-region 121-1. The communication management resource 140 assigns the channel selection information 222-2 a priority value of 2 (second highest priority selection of wireless channels by entity B).

Channel selection information 222-3 (namely, [000000BB00] indicates selection of wireless channels 7 and 8 for use in sub-region 121-1. The communication management resource 140 assigns the channel selection information 222-3 a priority value of 3 (third highest priority selection of wireless channels by entity B).

Channel selection information 222-4 (namely, [0000000BB0] indicates selection of wireless channels 8 and 9 for use in sub-region 121-1. The communication management resource 140 assigns the channel selection information 222-4 a priority value of 4 (fourth highest priority selection of wireless channels by entity B).

In this manner, each of the different sets of channel selection information indicates which wireless channels and corresponding permutations are of greatest interest to entity B.

FIG. 5 further illustrates channel selection information 233. For example, channel selection information 223-1 (namely, [0000CC0000] indicates selection of wireless channels 5 and 6 for use in sub-region 121-2. The communication management resource 140 assigns the channel selection information 223-1 a priority value of 1 (highest priority selection of wireless channels by entity C).

Channel selection information 223-2 (namely, [00000CC000] indicates selection of wireless channels 6 and 7 for use in sub-region 121-2. The communication management resource 140 assigns the channel selection information 223-2 a priority value of 2 (second highest priority selection of wireless channels by entity C).

Channel selection information 223-3 (namely, [000000CC00] indicates selection of wireless channels 7 and 8 for use in sub-region 121-2. The communication management resource 140 assigns the channel selection information 223-3 a priority value of 3 (third highest priority selection of wireless channels by entity C).

Channel selection information 223-4 (namely, [0000000CC0] indicates selection of wireless channels 8 and 9 for use in sub-region 121-2. The communication management resource 140 assigns the channel selection information 223-4 a priority value of 4 (fourth highest priority selection of wireless channels by entity C).

In this manner, each of the different sets of channel selection information indicates which wireless channels and corresponding permutations are of greatest interest to entity C.

FIG. 6 is an example diagram illustrating channel selection information and corresponding priority of channels of interest to a fourth licensed entity according to embodiments herein.

Channel selection information 224-1 (namely, [00000D0000] indicates selection of wireless channel 6 for use in both sub-region 121-1 and sub-region 121-2. The communication management resource 140 assigns the channel selection information 224-1 a priority value of 1 (highest priority selection of wireless channels by entity D).

Channel selection information 224-2 (namely, [000000D000] indicates selection of wireless channel 7 for use in both sub-region 121-1 and sub-region 121-2. The communication management resource 140 assigns the channel selection information 224-2 a priority value of 2 (second highest priority selection of wireless channels by entity D).

Channel selection information 224-3 (namely, [0000000D00] indicates selection of wireless channel 8 for use in both sub-region 121-1 and sub-region 121-2. The communication management resource 140 assigns the channel selection information 224-3 a priority value of 3 (second highest priority selection of wireless channels by entity D).

Channel selection information 224-4 (namely, [00000000D0] indicates selection of wireless channel 9 for use in both sub-region 121-1 and sub-region 121-2. The communication management resource 140 assigns the channel selection information 224-4 a priority value of 4 (second highest priority selection of wireless channels by entity D).

Figure 7:
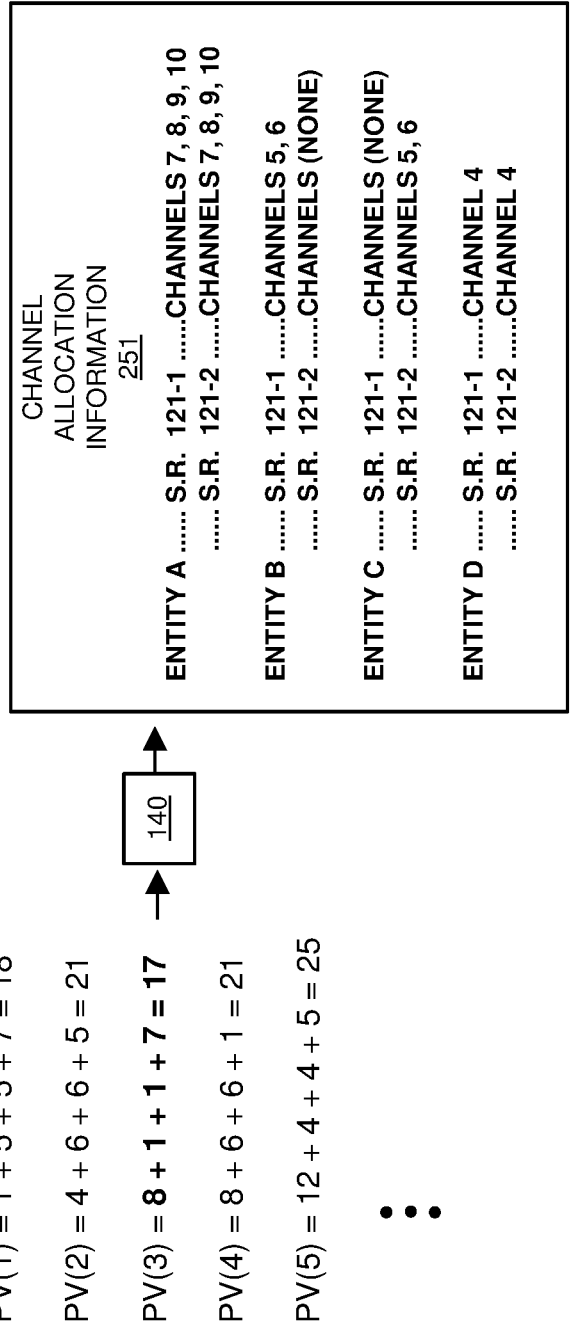
FIG. 7 is an example diagram illustrating an algorithm that generates channel allocation information for each of multiple licensed entities based on channel selection information according to embodiments herein.

FIG. 7 is an example diagram illustrating an algorithm that generates channel allocation information for each of multiple licensed entities based on channel selection information according to embodiments herein.

Further embodiments herein include, via the communication management resource 140 and implementation of a respective allocation algorithm, producing ranking metrics (such as PV1, PV2, PV3, etc.) including a respective ranking metric for each of multiple different possible permutations of allocating channels in the wireless band amongst the multiple entities A, B, C, and D.

In one embodiment, the communication management resource 140 generates ranking metrics (priority value, PV) in accordance with the equation:

$$PV(n)=PA(n)+PB(n)+PC(n)+PD(n),$$

where PA=the priority ranking of selected set associated with entity A, where PB=the priority ranking of selected set associated with entity B, where PC=the priority ranking of selected set associated with entity C, where PD=the priority ranking of selected set associated with entity D.

A first possible combination (permutation) of different channel assignments in accordance with the channel selection information 221-1, 222-5, 223-5, and 224-7 is as follows:

PVA=[0000AAAA00]=1
PVB=[00000000BB]=5
PVC=[00000000CC]=5
PVD=[00D0000000]=7

$$PV(1)=1+5+5+7=18$$

A second possible combination of different channel assignments in accordance with the channel selection information 221-2, 222-6, 223-6, and 224-5 is as follows:
    PVA=[00000AAAA0]=4
    PVB=[000BB00000]=6
    PVC=[000CC00000]=6
    PVD=[000000000D]=5

*PV*(2)=4+6+6+5=21

A third possible combination of different channel assignments in accordance with the channel selection information 221-3, 222-1, 223-1, and 224-7 is as follows:
    PVA=[000000AAAA]=8
    PVB=[0000BB0000]=1
    PVC=[0000CC0000]=1
    PVD=[00D0000000]=7

*PV*(3)=8+1+1+7=17

A fourth possible combination of different channel assignments in accordance with the channel selection information 221-3, 222-6, 223-6, and 224-1 is as follows:
    PVA=[000000AAAA]=8
    PVB=[000BB00000]=6
    PVC=[000CC00000]=6
    PVD=[00D0000000]=1

*PV*(4)=8+6+6+1=21

A fifth possible combination of different channel assignments in accordance with the channel selection information 221-4, 222-4, 223-4, and 224-5 is as follows:
    PVA=[000AAAA000]=12
    PVB=[000BB00000]=4
    PVC=[000CC00000]=4
    PVD=[00D0000000]=5

*PV*(5)=12+4+4+5=21

In this manner, the communication management resource 140 determines different possible combinations (such as solving a puzzle) of the selected wireless channels and assigns a respective priority value to each permutation.

Based on the ranking of values 18, 21, 17, 21, 25, etc., and corresponding comparison of a magnitude of the ranking values for the permutations, the communication management resource 140 allocates the wireless spectrum resources (such as one or more wireless channels) in accordance with the third option above because the resulting priority magnitude of 17 is the lowest among the different selection combinations.

More specifically, as indicated by allocation information 251, communication management resource 140 assigns entity A wireless channels 7, 8, 9, and 10 for use in sub-regions 121-1 and 121-2; communication management resource 140 assigns entity B wireless channels 5 and 6 for use in sub-region 121-1; communication management resource 140 assigns entity C wireless channels 5 and 6 for use in sub-region 121-2; communication management resource 140 assigns entity D wireless channel 4 for use in sub-region 121-1.

In this manner, each of the entities is assigned different channels of interest based on the provided channel selection priority information.

Note that the priority levels of the different licensed entities can be adjusted to accommodate situations in which a respective entity is assigned a less desired set of one or more channels in one region such that the entity is then more favored during allocation of wireless channels in another region. For example, this can be done by averaging the priority values selected for each entity over the last couple of channel allocations. This average priority value can then be used to determine a weight factor for each licensee which can be used for channel allocations subsequently in other sub-regions. Additionally, embodiments herein can include trading or re-assigning of allocated wireless channels from one entity to another. Furthermore, embodiments herein can include collaboration among entities to assign priorities to their respective channel lists.

Figure 8:
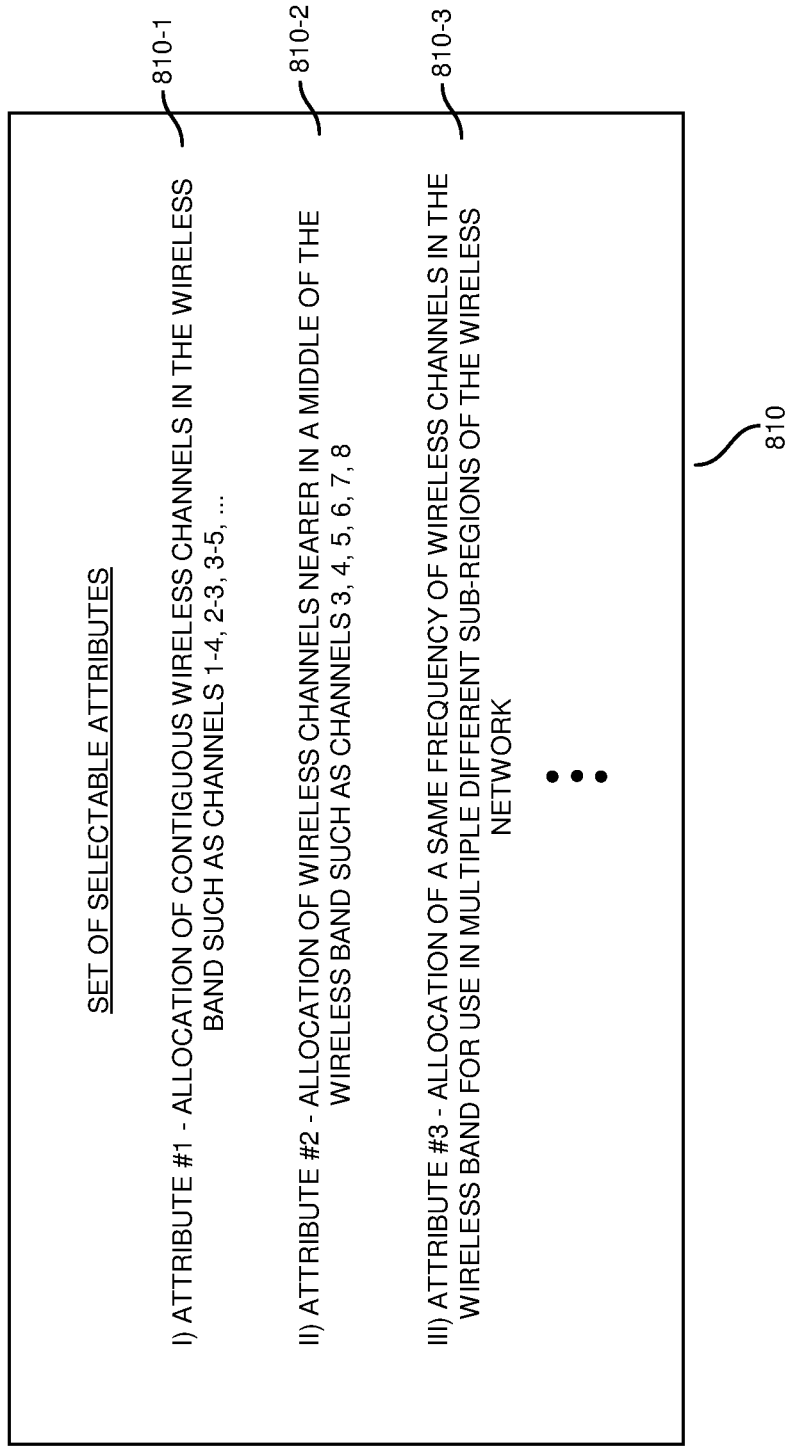
FIG. 8 is an example diagram illustrating selectable attributes describing channels of interest according to embodiments herein.

FIG. 8 is an example diagram illustrating selectable attributes describing channels of interest according to embodiments herein.

Note that as an alternative to specifying identities of respective channels of interest such as via the above brackets of channel selection information, each of the entities can be configured to provide a selection of desired one or more channels via ranking of one or more descriptive attributes 810.

More specifically, in one embodiment, each of the entities can be configured to indicate attributes of desired wireless channels via ranking of descriptive text. For example, in one embodiment, the text describing selectable attributes includes: i) a first descriptive attribute 810-1 indicating a desire for assignment of contiguous wireless channels in the available wireless band 310, ii) a second descriptive attribute 810-2 indicating a desire for assignment of wireless channels nearer a middle of the available wireless band 310 such as channels 3-8, iii) a third attribute 810-3 requesting allocation of a same frequency of wireless channels in the available wireless band 310 for use in multiple different sub-regions of the wireless network, and so on.

As previously discussed, the above non-exhaustive list of attributes in FIG. 8 can vary depending on the implementation. For example, one or more further embodiments herein include a selectable attribute such as a request for allocation of at least 3 contiguous wireless channels in the wireless band, such as 2-4, 4-6, 8-10, . . . ; another selectable attribute indicates a request for allocation of at least 2 contiguous wireless channels in the wireless band, such as 1-2, 3-4, 7-8, . . . ; another selectable attribute indicates request for allocation of wireless channels 3 channels away from the left edge of the wireless band; another selectable attribute indicates request for allocation of wireless channels 2 channels away from the right edge of the wireless band; another selectable attribute indicates a request for allocation of same frequency for at least 4 wireless channels in the wireless band for use in multiple different sub-regions of the wireless network; another selectable attribute indicates a request for allocation of same frequency for at least 2 wireless channels in the wireless band for use in multiple different sub-regions of the wireless network; and so on.

Figure 9:
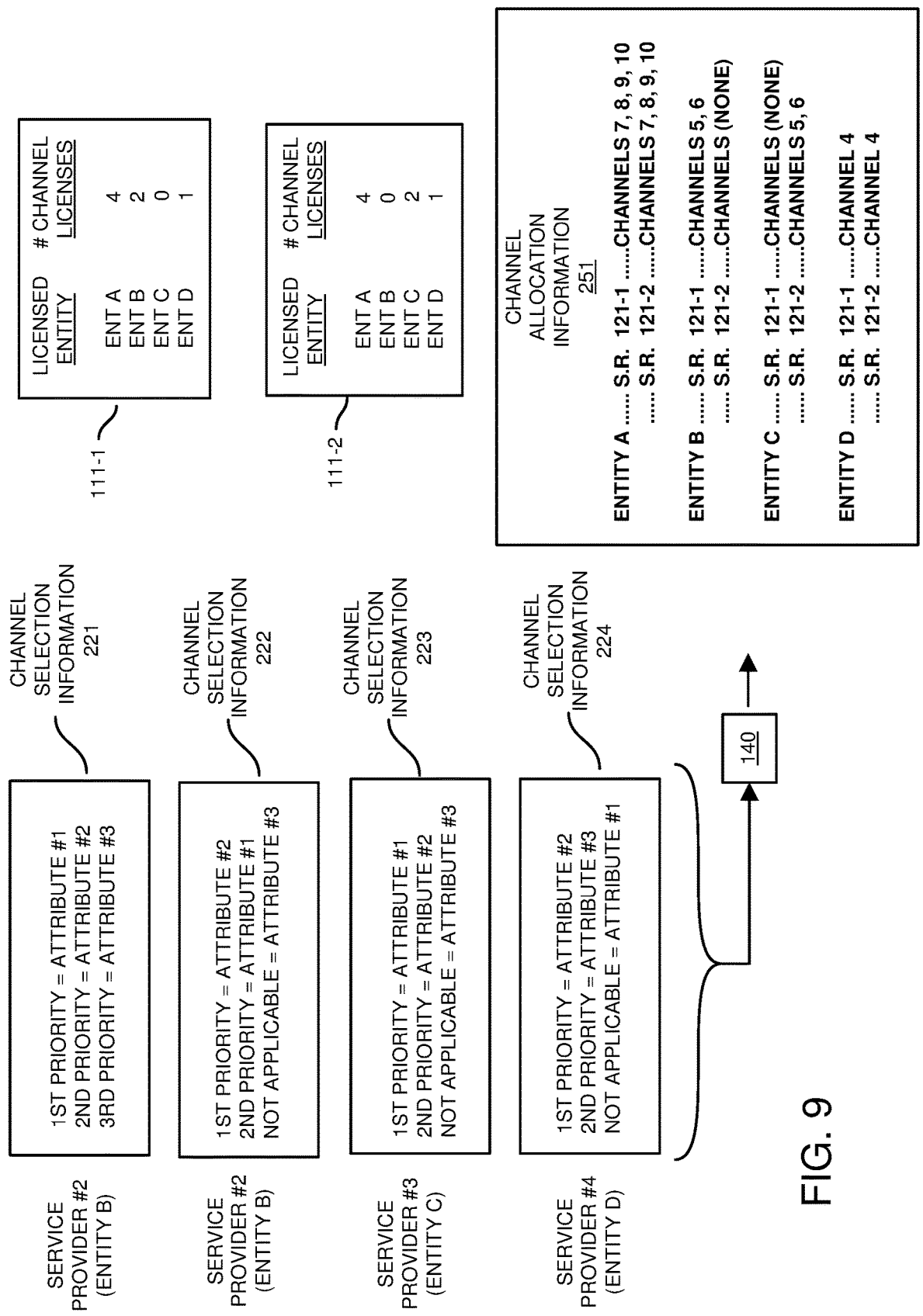
FIG. 9 is an example diagram illustrating use of ranked attributes to derive channel allocation information for multiple licensed entities according to embodiments herein.

FIG. 9 is an example diagram illustrating use of ranked attributes to derive channel allocation information for multiple licensed entities according to embodiments herein.

As indicated by license information 111-1 associated with the sub-region 121-1, entity A obtains licenses to use 4 wireless channels in the sub-region 121-1; entity B obtains licenses to use 2 wireless channels in the sub-region 121-1; entity D obtains a license to use 1 wireless channel in the sub-region 121-1.

As indicated by license information 111-2 associated with the sub-region 121-2, entity A obtains licenses to use 4 wireless channels in the sub-region 121-2; entity C obtains licenses to use 2 wireless channels in the sub-region 121-2; entity D obtains a license to use 1 wireless channel in the sub-region 121-2.

In this example embodiment, each license entity ranks one or more of the different attributes to indicate what types of respective licensed channels are most important to them.

For example, assume that the first entity A generates the channel selection information 221 to indicate desired channels via ranking of the multiple attributes. More specifically, entity A ranks attribute #1 (contiguous channels) as being of highest priority; entity A ranks attribute #2 (middle channels) as being of second highest priority; entity A ranks attribute #3 (same channels in different regions) as being of a third highest priority.

The second entity B generates the channel selection information 222 to indicate desired channels via ranking of the multiple attributes. More specifically, entity B ranks attribute #2 (middle channels) as being of first highest priority; entity B ranks attribute #1 (contiguous channels) as being of second highest priority. Attribute #3 (same channels in different regions) is not applicable.

The third entity C generates the channel selection information 223 to indicate desired channels via ranking of the multiple attributes. More specifically, entity C ranks attribute #1 (contiguous channels) as being of highest priority; entity C ranks attribute #2 (middle channels) as being of second highest priority. Attribute #3 (same channels in different regions) is not applicable.

The fourth entity D generates the channel selection information 224 to indicate desired channels via ranking of the multiple attributes. More specifically, entity D ranks attribute #2 (middle channel) as being of highest priority; entity D ranks attribute #3 (same channel in different regions) as being of second highest priority. Attribute #1 (contiguous channels) is not applicable.

Based on the selected channel attributes and corresponding ranking by each of the entities, the communication management resource 140 allocates the different available wireless channels to the entities. For example, the communication management resource 140 implements a best efforts algorithm to accommodate each of the entities.

In this example embodiment, in accordance with the selected attributes as indicated by the channel selection information 221, 222, 223, and 224 in FIG. 8, the communication management resource 140 assigns wireless channels 7, 8, 9, and 10 to entity A for use in both sub-regions 121-1 and 121-2; the communication management resource 140 assigns wireless channels 5 and 6 to entity B for use in sub-region 121-1; the communication management resource 140 assigns wireless channels 5 and 6 to entity C for use in sub-region 122-2; the communication management resource 140 assigns wireless channel 4 to entity D for use in both sub-regions 121-1 and 121-2.

Thus, in accordance with channel selection information, the communication management resource 140 allocates different wireless channels in the wireless band based on the first channel selection information 221, second channel selection information 222, channel selection information 223, and channel selection information 224.

In accordance with further example embodiments:
License entities may be allowed to coordinate their priority lists for better outcomes.
License entities may also be allowed to exchange their channel assignments.
License entities may be allowed to submit priority lists for allocation groups sequentially based on the outcome of other allocation groups, e.g. in counties nearby.
Secondary channel assignment to the channels not assigned in an allocation group may be done using the same principles.
A satisfaction metric can be used to favor channel assignment for licensees not satisfied with their assignments in other allocation groups.
Such a metric can be derived from the priority values picked for each licensee in assignments for previously run allocation groups.
A respective weight factor can be applied as a multiplicative factor to the licensee' priority list to weigh more favorable outcomes.

Figure 10:
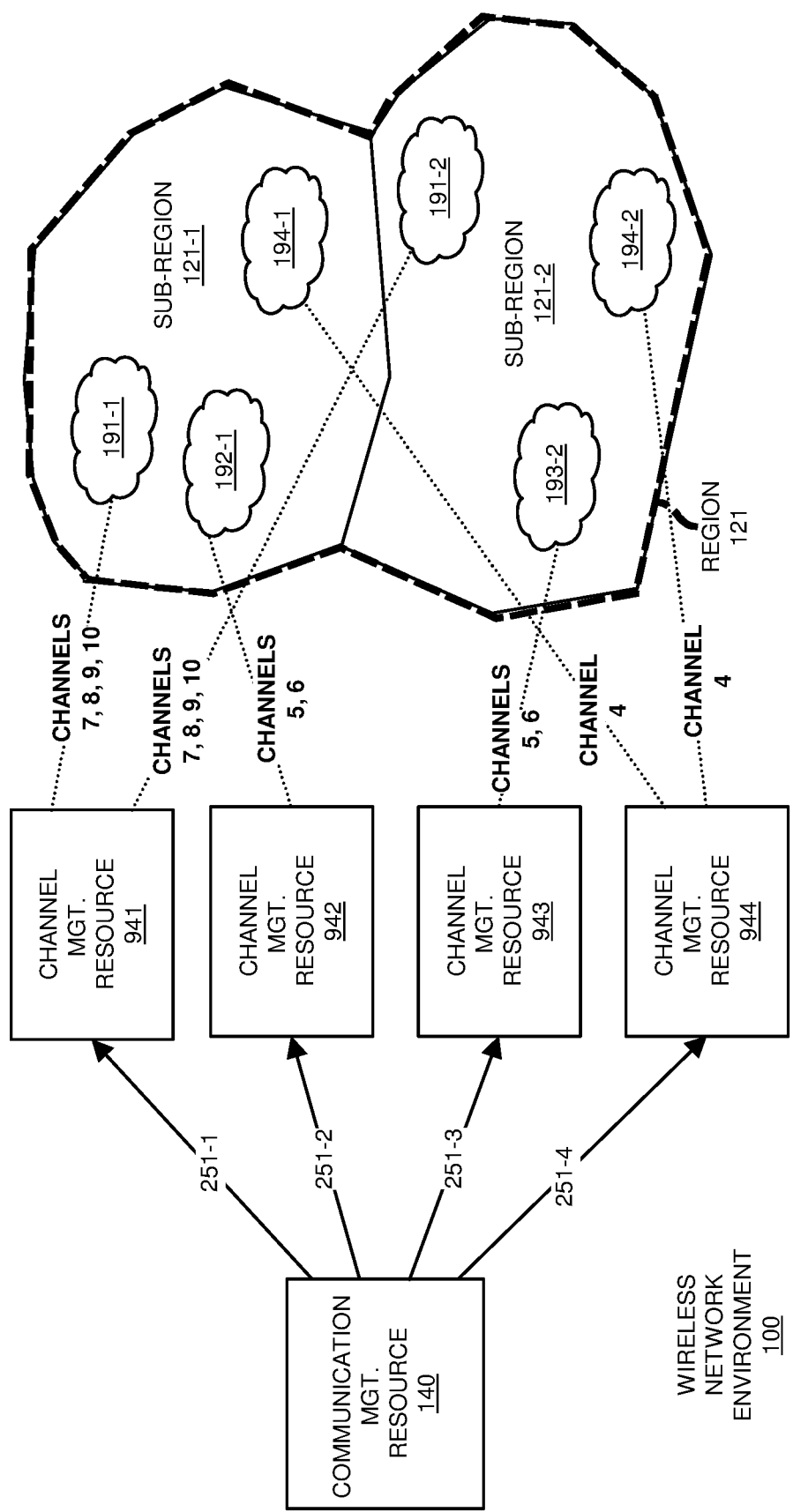
FIG. 10 is an example diagram illustrating multiple licensed entities and corresponding use of allocated wireless band according to embodiments herein.

FIG. 10 is an example diagram illustrating multiple licensed entities and corresponding use of allocated wireless band according to embodiments herein.

As previously discussed, the communication management resource 140 assigns different wireless channels (such as all or a portion of wireless channels 1-10 in FIG. 3) to the different licensed entities. Communication management resource 140 distributes the channel access information 251 to each of the channel management resources (such as spectrum access systems). Accordingly, the channel management resources 941, 942, 943, and 944 are made aware of the assignment of different wireless channels to the different licensed service providers operating in the region 121.

For example, via distribution of channel allocation information 251-1, the communication management resource 140 notifies the channel management resource 941 that channels 7, 8, 9, and 10 have been allocated for use by entity A (such as wireless service provider #1 and corresponding devices) and corresponding wireless network 191-1 and wireless network 191-2. In such an instance, the channel management resource 941 (such as first spectrum access system) allocates use of channels 7, 8, 9, and 10 for use by wireless communication equipment (such as wireless base stations, mobile communication devices, etc.) in wireless network 191-1 and wireless network 191-2.

Via distribution of channel allocation information 251-2, the communication management resource 140 notifies the channel management resource 942 that channels 5 and 6 have been allocated for use by entity B (service provider #2) and corresponding wireless network 192-1. In such an instance, the channel management resource 942 (such as a corresponding spectrum access system) allocates use of channels 5 and 6 for use by wireless communication equipment (such as wireless base stations, mobile communication devices, etc.) in wireless network 192-1.

Via distribution of channel allocation information 251-3, the communication management resource 140 notifies the channel management resource 943 that channels 5 and 6 have been allocated for use by entity C (service provider #3) and corresponding wireless network 193-2. In such an instance, the channel management resource 943 (such as a corresponding spectrum access system) allocates use of channels 5 and 6 for use by wireless communication equipment (such as wireless base stations, mobile communication devices, etc.) in wireless network 193-2.

Via distribution of channel allocation information 251-4, the communication management resource 140 notifies the channel management resource 944 that channel 4 has been allocated for use by entity D (service provider #4) and corresponding wireless network 194-1 and wireless network 191-2. In such an instance, the channel management resource 944 (such as a corresponding spectrum access system) allocates use of channel 4 for use by wireless communication equipment (such as wireless base stations, mobile communication devices, etc.) in wireless network 194-1 and wireless network 194-2.

As previously discussed, use of the respective assigned channels is subject to availability and non-use of such one or more channels via an incumbent users having higher priority access rights than the licensed entities.

Figure 11:
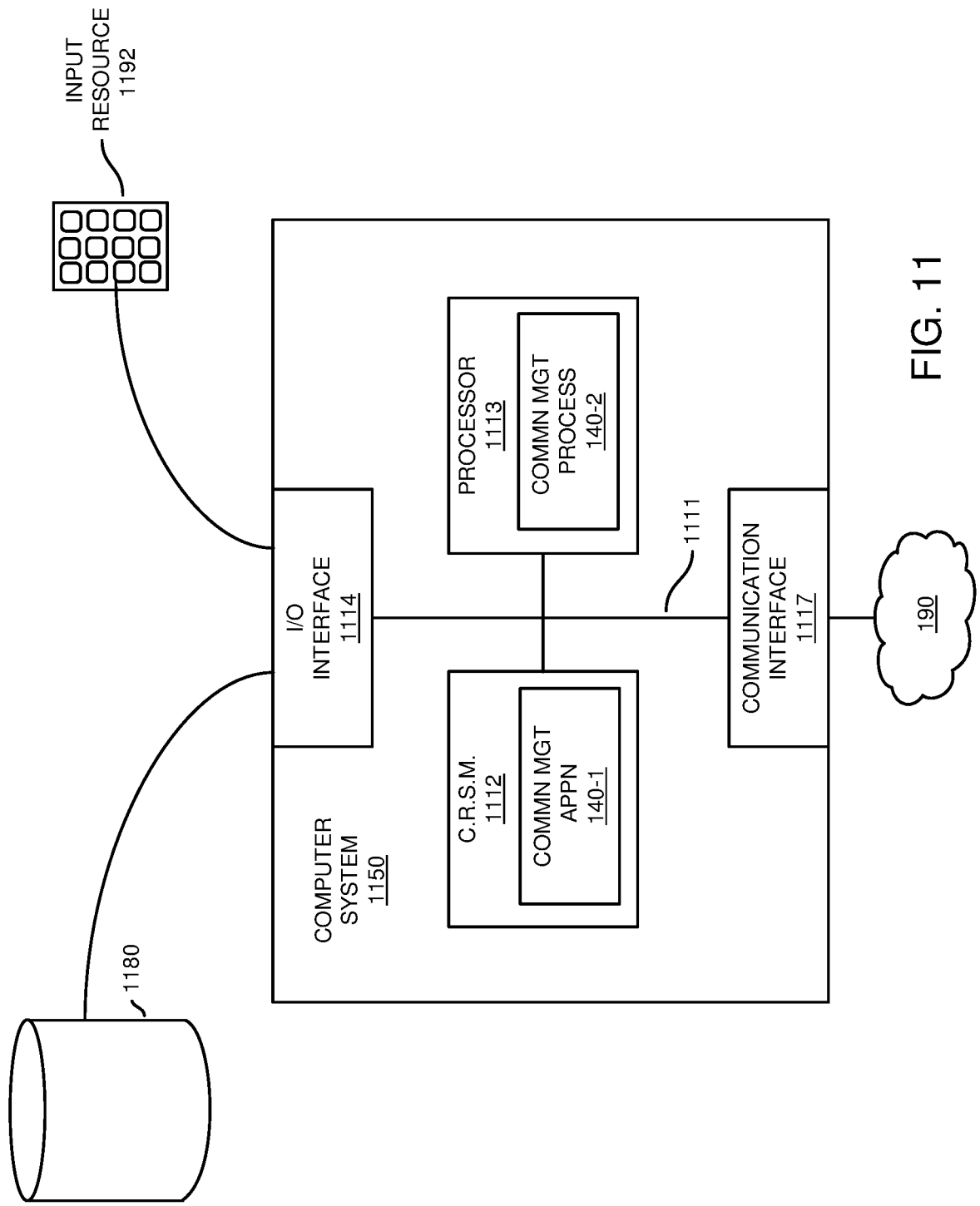
FIG. 11 is a diagram illustrating example computer architecture to execute one or more operations according to embodiments herein.

FIG. 11 is an example block diagram of a computer system for implementing any of the operations as previously discussed according to embodiments herein.

Any of the resources (such as communication management resource 140, etc.) as discussed herein can be configured to include computer processor hardware and/or corresponding executable instructions to carry out the different operations as discussed herein.

As shown, computer system 1150 of the present example includes an interconnect 1111 that couples computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with communication management application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the communication management application 140-1 produces communication management process 140-2 to carry out any of the operations and/or processes as discussed herein.

Those skilled in the art will understand that the computer system 1150 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIG. 12. Note that the steps in the flowcharts below can be executed in any suitable order.

Figure 12:
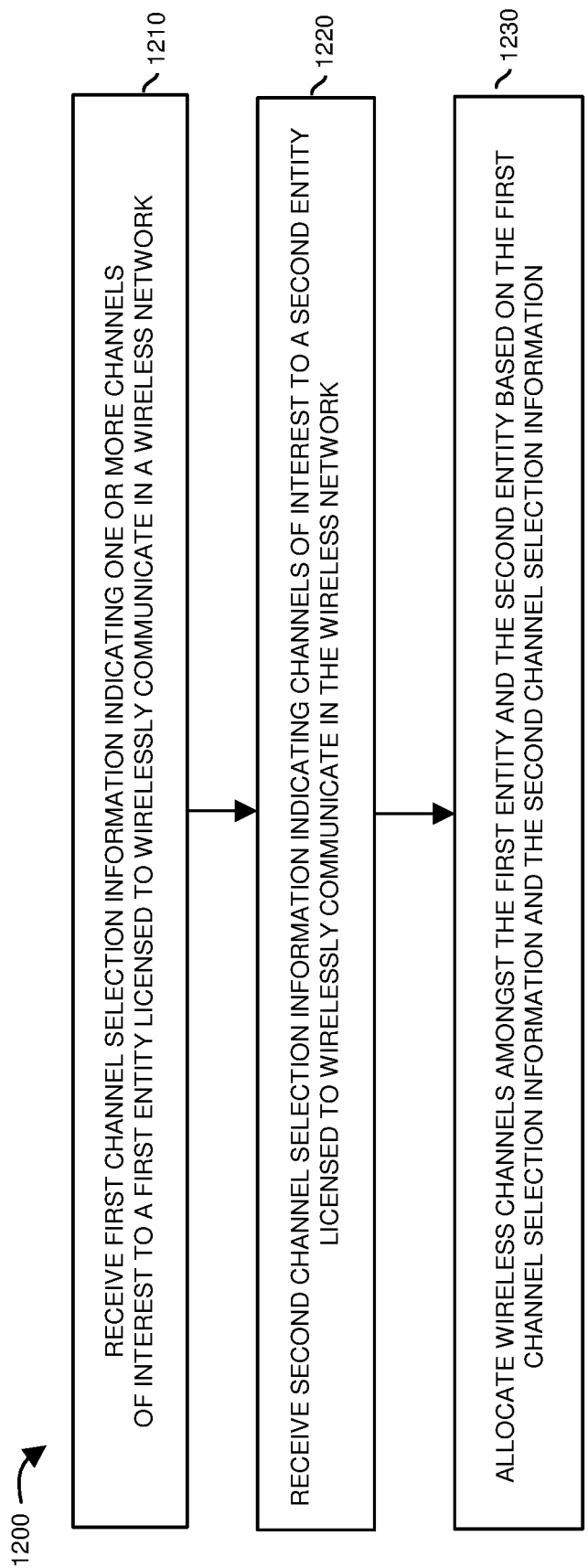
FIG. 12 is an example diagram illustrating a method according to embodiments herein.

FIG. 12 is a flowchart 1200 illustrating an example method according to embodiments. Note that there will be some overlap with respect to concepts as discussed above.

In processing operation 1210, the communication management resource 140 receives first channel selection information 221 indicating wireless resources of interest to a first entity (such as entity A or service provider #1) licensed to wirelessly communicate in region 121 of wireless network 100.

In processing operation 1220, the communication management resource 140 receives second channel selection information 222 indicating wireless resources of interest to a second entity (such as entity B or service provider #2) licensed to wirelessly communicate in region 121 of the wireless network environment 100.

In processing operation 1220, the communication management resource 140 allocates wireless resources (such as via wireless band information 251 indicating wireless resources such as bandwidth, bandwidth partitions, one or more portions of bandwidth, sub-band portions, sub-band segments, etc., of an available wireless spectrum or band) amongst the first entity and the second entity based on the first channel selection information 221 and the second channel selection information 222.

Note again that techniques herein are well suited to facilitate fair and desirable assignment of wireless channels in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
 receiving first channel selection information indicating channels of interest to a first entity licensed to wirelessly communicate in a wireless network;
 receiving second channel selection information indicating channels of interest to a second entity licensed to wirelessly communicate in the wireless network; and
 allocating wireless channels from a wireless band, the wireless channels allocated amongst the first entity and the second entity based on the first channel selection information and the second channel selection information, the wireless channels allocated to the first entity and the second entity as licensed wireless channels.

2. The method as in claim 1, wherein the first channel selection information indicates a priority ranking of first wireless channels of interest to the first entity; and
 wherein the second channel selection information indicates a priority ranking of second wireless channels of interest to the second entity.

3. The method as in claim 2, wherein the priority ranking of the first wireless channels of interest indicates a first wireless channel as being of greater interest than a second wireless channel to the first entity; and
 wherein the priority ranking of the second wireless channels of interest indicates the second wireless channel as being of greater interest than the first wireless channel to the second entity.

4. The method as in claim 3, wherein allocating the wireless channels includes:
 in accordance with the first channel selection information and the second channel selection information: i) assigning the first wireless channel for use by the first entity; and ii) assigning the second wireless channel for use by the second entity.

5. The method as in claim 1, wherein the wireless network includes multiple sub-regions, the wireless channels allocated to the first entity and the second entity for use in the multiple sub-regions, the first entity being licensed to operate in at least one of the multiple sub-regions, the second entity being licensed to operate in at least one of the multiple sub-regions.

6. The method as in claim 1, wherein the wireless band includes a set of multiple contiguous wireless channels; and
 wherein allocating the wireless channels amongst the first entity and the second entity includes: i) allocating a first set of contiguous wireless channels from the wireless band in accordance with the first channel selection information; and i) allocating a second set of contiguous wireless channels from the wireless band in accordance with the second channel selection information.

7. The method as in claim 1, wherein the first channel selection information indicates priority rankings of first wireless channels of interest to the first entity for each of multiple different geographical sub-regions in which the wireless band is available for use; and
 wherein the second channel selection information indicates priority rankings of second wireless channels of interest to the second entity for each of the multiple different geographical sub-regions in which the wireless band is available for use.

8. The method as in claim 7 further comprising:
 applying first weight factors to the priority rankings of the first channels of interest to the first entity depending on a number of channels licensed by the first entity; and
 applying second weight factors to the priority rankings of the second channels of interest to the second entity depending on a number of channels licensed by the second entity.

9. The method as in claim 1 further comprising:
 producing multiple ranking metrics including a respective ranking metric for each of multiple different possible permutations of allocating channels in the wireless band amongst the first entity and the second entity; and
 allocating portions of the wireless band based on comparison of the ranking metrics.

10. The method as in claim 9, wherein allocating portions of the wireless band based on the comparison of the ranking metrics includes selecting an allocation of wireless channels in the wireless band that accommodates requested channels as indicated by the first channel selection information and the second channel selection information.

11. The method as in claim 1, wherein each of the first channel selection information and the second channel selection information indicates a priority ranking of multiple attributes of wireless channels of interest.

12. The method as in claim 11, wherein the multiple attributes are selected from a group of attributes comprising:
 i) a first attribute specifying allocation of contiguous wireless channels in the wireless band,
 ii) a second attribute specifying allocation of wireless channels nearer a middle of the wireless band, and
 iii) a third attribute specifying allocation of a same frequency of wireless channels in the wireless band for use in multiple different sub-regions of the wireless network.

13. The method as in claim 1, wherein the licensed channels are wireless channels allocated from a CBRS (Citizen Band Radio Service) spectrum.

14. The method as in claim 1, wherein allocating the wireless channels includes:
 based on the first channel selection information, allocating a first set of licensed wireless channels from the wireless band to the first entity; and
 based on the second channel selection information, allocating a second set of licensed wireless channels from the wireless band to the second entity.

15. The method as in claim 14, wherein the first set of licensed wireless channels allocated to the first entity include first contiguous wireless channels as specified by the first channel selection information; and
 wherein the second set of licensed wireless channels allocated to the second entity include second contiguous wireless channels as specified by the second channel selection information.

16. The method as in claim 1 further comprising:
 applying first weight factors to priority rankings of the channels of interest to the first entity to select first wireless channels for allocation to the first entity, magnitudes of the first weight factors depending on a number of channels licensed by the first entity; and
 applying second weight factors to priority rankings of the channels of interest to the second entity to select second wireless channels for allocation to the second entity, magnitudes of the second weight factors depending on a number of channels licensed by the second entity.

17. The method as in claim 1, wherein the first channel selection information indicates priority rankings of first wireless channels of interest to the first entity for each of multiple different sub-regions in which the wireless band is allocated; and
wherein the second channel selection information indicates priority rankings of second wireless channels of interest to the second entity for each of the multiple different sub-regions in which the wireless band is allocated.

18. The method as in claim 1, wherein each of the first channel selection information and the second channel selection information indicates multiple attributes including: i) a first attribute specifying allocation of contiguous wireless channels of interest in the wireless band, and ii) a second attribute specifying a location of wireless channels of interest within the wireless band.

19. The method as in claim 1 further comprising:
producing a first numerical value based on the first channel selection information;
producing a second numerical value based on the second channel selection information; and
selecting allocation of the wireless channels from the wireless band based on a summation of the first numerical value and the second numerical value.

20. The method as in claim 19, wherein the first numerical value is a first priority value;
wherein the second numerical value is a second priority value; and
the method further comprising: selecting the allocation of wireless channels from the wireless band to the first entity and the second entity based on a magnitude of the summation.

21. The method as in claim 1, wherein the first channel selection information indicates: i) a first grouping of wireless channels of interest to the first entity, and ii) a second grouping of wireless channels of interest to the first entity; and
wherein the second channel selection information indicates: i) a third grouping of wireless channels of interest to the second entity, and ii) a fourth grouping of wireless channels of interest to the second entity.

22. The method as in claim 21, wherein the first grouping is assigned a first priority value;
wherein the second grouping is assigned a second priority value, the second priority value different than the first priority value;
wherein the third grouping is assigned a third priority value; and
wherein the fourth grouping is assigned a fourth priority value, the fourth priority value different than the third priority value.

23. The method as in claim 22, wherein wireless channels as specified by the first grouping are non-overlapping with respect to wireless channels as specified by the third grouping;
wherein wireless channels as specified by the second grouping are non-overlapping with respect to wireless channels as specified by the fourth grouping, the method further comprising:
summing the first priority value and the third priority value to produce a first summation value; and
summing the second priority value and the fourth priority value to produce a second summation value.

24. The method as in claim 23 further comprising:
comparing a magnitude of the first summation value and the second summation value; and
based on the comparison, allocating the wireless channels as specified by the first grouping to the first entity and allocating the wireless channels as specified by the third grouping to the second entity.

25. A system comprising:
communication management hardware operable to:
receive first channel selection information indicating channels of interest to a first entity licensed to wirelessly communicate in a wireless network;
receive second channel selection information indicating channels of interest to a second entity licensed to wirelessly communicate in the wireless network; and
allocate wireless channels from a wireless band, the wireless channels allocated amongst the first entity and the second entity based on the first channel selection information and the second channel selection information, the wireless channels allocated to the first entity and the second entity as licensed wireless channels.

26. The system as in claim 25, wherein the first channel selection information indicates a priority ranking of first wireless channels of interest to the first entity; and
wherein the second channel selection information indicates a priority ranking of second wireless channels of interest to the second entity.

27. The system as in claim 26, wherein the priority ranking of the first wireless channels of interest indicates a first wireless channel as being of greater interest than a second wireless channel to the first entity; and
wherein the priority ranking of the second wireless channels of interest indicates the second wireless channel as being of greater interest than the first wireless channel to the second entity.

28. The system as in claim 27, wherein the communication management resource is further operable to:
in accordance with the first channel selection information and the second channel selection information: i) assign the first wireless channel for use by the first entity; and ii) assign the second wireless channel for use by the second entity.

29. The system as in claim 25, wherein the wireless network includes multiple sub-regions, the wireless channels allocated to the first entity and the second entity for use in the multiple sub-regions, the first entity being licensed to operate in at least one of the multiple sub-regions, the second entity being licensed to operate in at least one of the multiple sub-regions.

30. The system as in claim 25, wherein the wireless band includes a set of multiple contiguous wireless channels; and
wherein the communication management resource is further operable to: i) allocate a first set of contiguous wireless channels from the set in accordance with the first channel selection information; and ii) allocate a second set of contiguous wireless channels from the set in accordance with the second channel selection information.

31. The system as in claim 25, wherein the first channel selection information indicates priority rankings of first wireless channels of interest to the first entity for each of multiple different geographical sub-regions in which the wireless band is available for use; and
wherein the second channel selection information indicates priority rankings of second wireless channels of interest to the second entity for each of the multiple different sub-regions in which the wireless band is available for use.

32. The system as in claim 31, wherein the communication management resource is further operable to:
apply first weight factors to the priority rankings of the first channels of interest to the first entity depending on a number of channels licensed by the first entity; and
apply second weight factors to the priority rankings of the second channels of interest to the second entity depending on a number of channels licensed by the second entity.

33. The system as in claim 25, wherein the communication management resource is further operable to:
produce multiple ranking metrics including a respective ranking metric for each of multiple different possible permutations of allocating channels in the wireless band amongst the first entity and the second entity; and
allocate wireless channels from the wireless band based on comparison of the ranking metrics.

34. The system as in claim 33, wherein the communication management resource is further operable to:
based on the comparison, select an allocation of wireless channels in the wireless band that accommodates requested channels as indicated by the first channel selection information and the second channel selection information.

35. The system as in claim 25, wherein each of the first channel selection information and the second channel selection information indicates a priority ranking of multiple attributes of wireless channels of interest.

36. The system as in claim 35, wherein the multiple attributes are selected from a group of attributes comprising:
i) a first attribute requesting allocation of contiguous wireless channels in the wireless band,
ii) a second attribute requesting allocation of wireless channels nearer in a middle of the wireless band, and
iii) a third attribute requesting allocation of a same frequency of wireless channels in the wireless band for use in multiple different sub-regions of the wireless network.

37. The system as in claim 25, wherein the wireless band is a CBRS (Citizen Band Radio Service) band.

38. Computer-readable storage hardware having instructions stored thereon, the instructions, when carried out by computer processor hardware, cause the computer processor hardware to:
receive first channel selection information indicating channels of interest to a first entity licensed to wirelessly communicate in a wireless network;
receive second channel selection information indicating channels of interest to a second entity licensed to wirelessly communicate in the wireless network; and
allocate wireless channels amongst the first entity and the second entity based on the first channel selection information and the second channel selection information, the wireless channels being allocated as licensed wireless channels.

* * * * *